United States Patent
Yeh et al.

(10) Patent No.: US 9,582,047 B2
(45) Date of Patent: Feb. 28, 2017

(54) ELECTRONIC DEVICE AND LOCKING STRUCTURE THEREOF

(71) Applicants: Yao-Tsung Yeh, Taipei (TW); Wei-Chih Hsu, Taipei (TW); Li-Fang Chen, Taipei (TW); Che-Hsien Lin, Taipei (TW); Wei-Hao Lan, Taipei (TW); Kun-Hsin Liu, Taipei (TW)

(72) Inventors: Yao-Tsung Yeh, Taipei (TW); Wei-Chih Hsu, Taipei (TW); Li-Fang Chen, Taipei (TW); Che-Hsien Lin, Taipei (TW); Wei-Hao Lan, Taipei (TW); Kun-Hsin Liu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 91 days.

(21) Appl. No.: 14/538,794

(22) Filed: Nov. 11, 2014

(65) Prior Publication Data

US 2015/0131218 A1 May 14, 2015

Related U.S. Application Data

(60) Provisional application No. 61/903,428, filed on Nov. 13, 2013, provisional application No. 61/977,631, filed on Apr. 10, 2014.

(51) Int. Cl.
*G06F 1/16* (2006.01)
(52) U.S. Cl.
CPC .............. *G06F 1/1681* (2013.01); *G06F 1/162* (2013.01)
(58) Field of Classification Search
CPC .... G06F 1/1616; G06F 1/1637; G06F 1/1605; G06F 1/163; G06F 1/1641; G06F 1/1643; G06F 1/1647; G06F 1/1681; G06F 1/16; G06F 1/1601; G06F 1/1613; G06F 1/1618; G06F 1/1626; G06F 1/1649; G06F 1/1656; G06F 1/169; G06F 1/1679; G06F 1/1683; G06F 1/162; H05K 5/0017; H05K 13/046; H05K 3/301; H05K 5/0221; H05K 5/0226; H05K 5/04
USPC ......................... 361/679.01, 679.02, 679.09, 679.21,361/679.22, 679.26, 679.27; 248/917–924
See application file for complete search history.

(56) References Cited

U.S. PATENT DOCUMENTS

2008/0238816 A1 * 10/2008 Matsushita ............. G06F 1/162
345/30
2011/0127184 A1 6/2011 Kawada et al.

* cited by examiner

*Primary Examiner* — Anthony Haughton
*Assistant Examiner* — Ingrid Wright
(74) *Attorney, Agent, or Firm* — Jianq Chyun IP Office

(57) ABSTRACT

An electronic device includes a first body, a second body, a first pivot structure, a second pivot structure, and a locking structure not in contact with the second pivot structure. The second pivot structure is pivoted to the first body along a first axis through the first pivot structure. The second body is pivoted to the first pivot structure along a second axis through the second pivot structure. When the second body is unfolded to an open position along the first axis, the first pivot structure drives the locking structure to go to an unlocked state, and the second body is adapted to rotate along the second axis. When the second body is folded or unfolded to other positions along the first axis, the first pivot structure drives the locking structure to go to a locked state, and the locking structure stops the second body rotating along the second axis.

20 Claims, 10 Drawing Sheets

ELECTRONIC DEVICE AND LOCKING STRUCTURE THEREOF

CROSS-REFERENCE TO RELATED APPLICATION

This application claims the priority benefits of U.S. provisional application Ser. No. 61/903,428, filed on Nov. 13, 2013, and U.S. provisional application Ser. No. 61/977,631, filed on Apr. 10, 2014. The entirety of each of the above-mentioned patent applications is hereby incorporated by reference herein and made a part of this specification.

FIELD OF THE INVENTION

The invention relates to an electronic device and a locking structure thereof, and in particular, to an electronic device having bodies that can be unfolded/folded and rotated relative to each other and a locking structure of the electronic device.

DESCRIPTION OF RELATED ART

In recent years, with the advance of technology industries, electronic products including notebook computers, smart phones, and tablet computers have appeared frequently in everyday lives. Types and functions of the electronic products have become increasingly diverse, and convenience and practicality of these electronic products result in popularity thereof.

In order for users to watch display screens or perform actions on the display screens of the notebook computers, some of the display screens in the open or unfolded state are able to rotate relative to the host, so that the display surface may face to different directions. However, said design easily causes the users to erroneously rotate the display screens and brings inconvenience to the users. For instance, a user may unexpectedly exert a force to the display screen and rotate the display screen, given that the display screen is yet unfolded to a sufficient extent. As a result, the display screen may dash against or press on the host, which may lead to damages to the notebook computer.

SUMMARY OF THE INVENTION

The invention is directed to an electronic device and a locking structure thereof, whereby users can be precluded from unexpectedly rotating bodies of the electronic device.

In an embodiment of the invention, an electronic device that includes a first body, a second body, a first pivot structure, a second pivot structure, and a locking structure is provided. The second pivot structure is pivoted to the first body along a first axis through the first pivot structure, and the second body is pivoted to the first pivot structure along a second axis through the second pivot structure. The locking structure is arranged between the first pivot structure and the second body. When the second body is unfolded relative to the first body to an open position along the first axis, the first pivot structure drives the locking structure to go to an unlocked state, and the second body is adapted to rotate relative to the first body along the second axis. When the second body is folded or unfolded relative to the first body to other positions along the first axis, the first pivot structure drives the locking structure to go to a locked state, and the locking structure stops the second body from rotating relative to the first body along the second axis. The locking structure in both the unlocked state and the locked state is not in contact with the second pivot structure.

According to an embodiment of the invention, the second pivot structure is a pivot structure without torsion.

According to an embodiment of the invention, the second body has a positioning trench, and the locking structure is adapted to extend into the positioning trench and stop the second body from rotating relative to the first body along the second axis.

According to an embodiment of the invention, the electronic device further includes a base that is located between the first body and the second body, and the first pivot structure and the second pivot structure are respectively located on different regions on the base.

According to an embodiment of the invention, the first pivot structure includes a first component and a second component that are pivoted to each other and respectively connected to the first body and the second pivot structure, and the locking structure includes a limiting member, a locking member, and a stopper. The limiting member is fixed to the first component. The locking member is movably arranged on the second component. The stopper is movably arranged on the first component or the second component and located between the limiting member and the locking member. When the second body is unfolded relative to the first body to the open position along the first axis, the limiting member releases the stopper through a relative pivoting action of the first and second components, such that the stopper is adapted to release the locking member, and that the locking member is adapted to be moved away from the second body. When the second body is folded or unfolded relative to the first body to other positions along the first axis, the limiting member limits the stopper through the relative pivoting action of the first and second components, and the stopper stops the locking member from being moved away from the second body.

In an embodiment of the invention, a locking structure adapted to an electronic device is provided. The electronic device includes a first body, a second body, a first pivot structure, and a second pivot structure. The first pivot structure includes a first component and a second component pivoted to each other along a first axis and respectively connected to the first body and the second pivot structure. The second body is pivoted to the second component along a second axis through the second pivot structure. The locking structure includes a limiting member, a locking member, and a stopper. The limiting member is fixed to the first component. The locking member is movably arranged on the second component. The stopper is movably arranged on the first component or the second component and located between the limiting member and the locking member. When the second body is unfolded relative to the first body to the open position along the first axis, the limiting member releases the stopper through a relative pivoting action of the first and second components, such that the stopper is adapted to release the locking member, and that the locking member is adapted to be moved away from the second body. When the second body is folded or unfolded relative to the first body to other positions along the first axis, the limiting member limits the stopper through the relative pivoting action of the first and second components, and the stopper stops the locking member from being moved away from the second body.

According to an embodiment of the invention, the locking structure includes an elastic member connected to the locking member, and the locking member is adapted to interfere with the second body through an elastic force of the elastic member.

According to an embodiment of the invention, the locking structure includes an elastic member connected to the stopper, and the stopper continuously leans against the limiting member through an elastic force of the elastic member.

According to an embodiment of the invention, the stopper is slidably arranged on the second component along a direction perpendicular to or parallel to the first axis.

According to an embodiment of the invention, the limiting member is a cam and has a first leaning surface and a second leaning surface, and a distance between the first leaning surface and the first axis is less than a distance between the second leaning surface and the first axis. When the second body is located at the open position, the first leaning surface is aligned to the stopper, such that the stopper is adapted to lean against the first leaning surface and is adapted to be moved away from the locking member. When the second body is located at other positions, the second leaning surface is aligned to the stopper, such that the stopper is limited by the second leaning surface and stops the locking member.

According to an embodiment of the invention, a magnetic attraction force is adapted to be generated between the stopper and the limiting member, and the stopper continuously leans against the limiting member through the magnetic attraction force.

According to an embodiment of the invention, the stopper is a magnetic element, and the limiting member is a magnetically sensitive element.

According to an embodiment of the invention, the limiting member has a recess, the stopper has a protrusion and a space-allowing hole, and the locking member has a post. When the second body is located at the open position, and the protrusion is aligned to the recess, the protrusion is adapted to enter the recess to drive the space-allowing hole to be aligned to the post, and the post is adapted to enter the space-allowing hole to drive the locking member to move away from the second body. When the second body is located at other positions, and the protrusion is misaligned to the recess, the stopper is limited by the limiting member, and the space-allowing hole is misaligned to the post to stop the post from entering the space-allowing hole.

According to an embodiment of the invention, the electronic device further includes a first magnetic member and a second magnetic member, the first magnetic member is arranged between the second pivot structure and the first pivot structure, and the second magnetic member is arranged on the second body. Relative positions of the first body and the second body are adapted to be fixed through a magnetic attraction force between the first magnetic member and the second magnetic member.

In view of the above, the locking structure described herein allows the second body to rotate relative to the first body only when the second body of the electronic device is unfolded to a certain open position, and the locking structure prevents the second body from rotating relative to the first body if the second body is folded or unfolded to other positions. Thereby, the user will not unexpectedly rotate the second body of the electronic device; as such, the electronic device can be controlled and operated in a smooth manner, and damages caused by erroneous operations of the second body to the electronic device may be better prevented.

Several exemplary embodiments accompanied with figures are described in detail below to further describe the invention in details.

DETAILED DESCRIPTION OF DISCLOSED EMBODIMENTS

Figure 1:
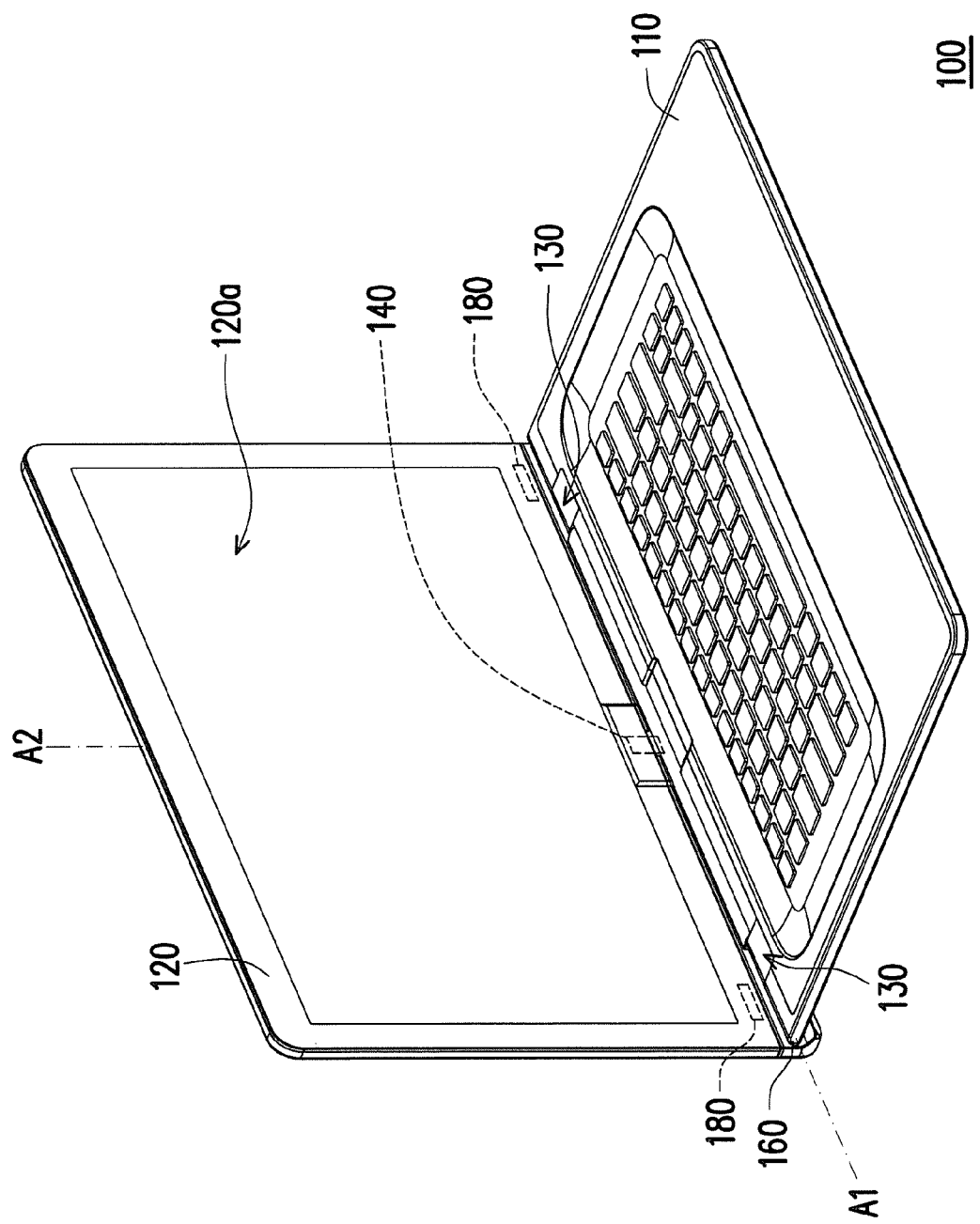
FIG. 1 is a three-dimensional view illustrating an electronic device according to an embodiment of the invention.
Figure 2:
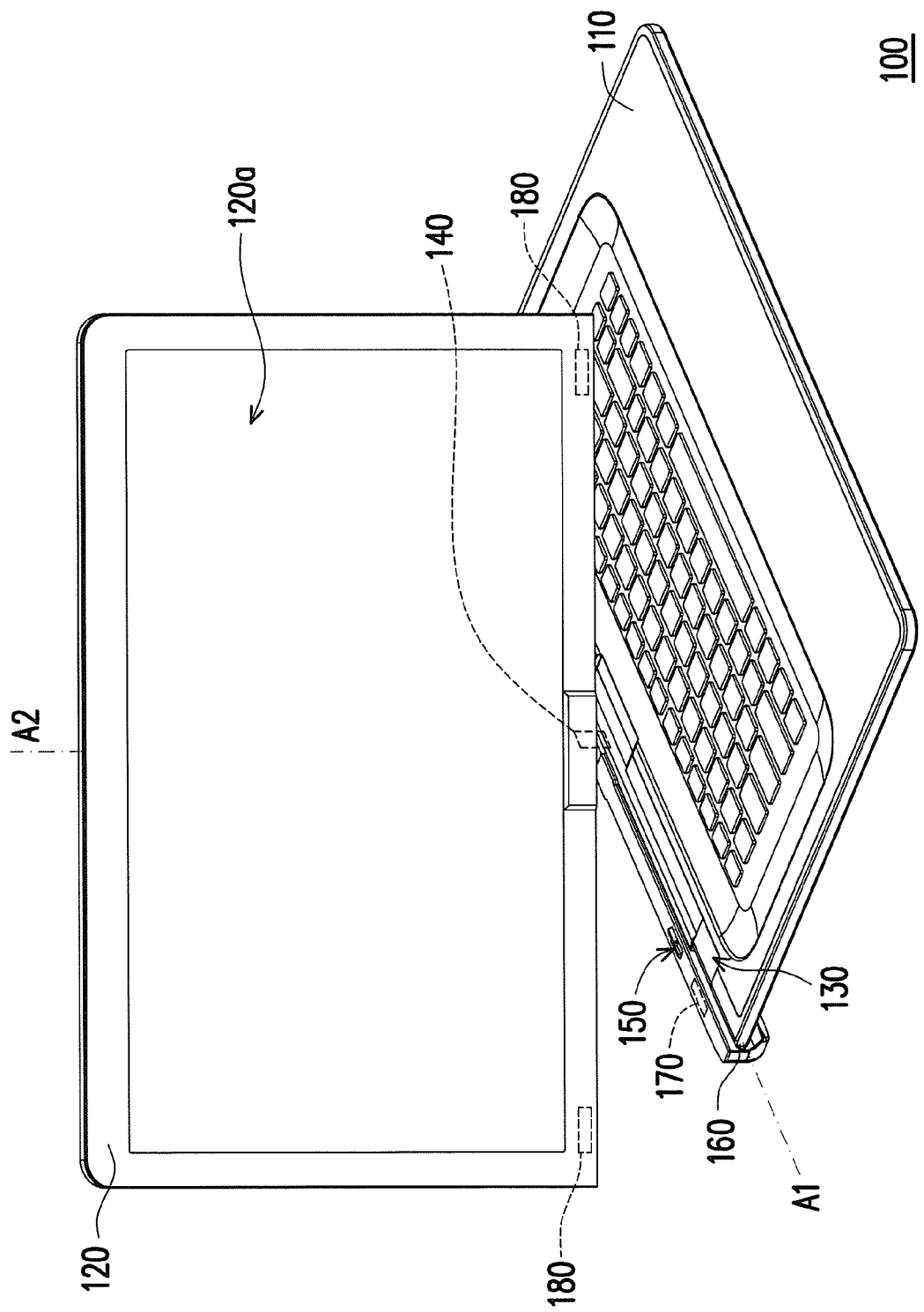
FIG. 2 illustrates the second body depicted in FIG. 1 rotates relative to the first body.
Figure 3:
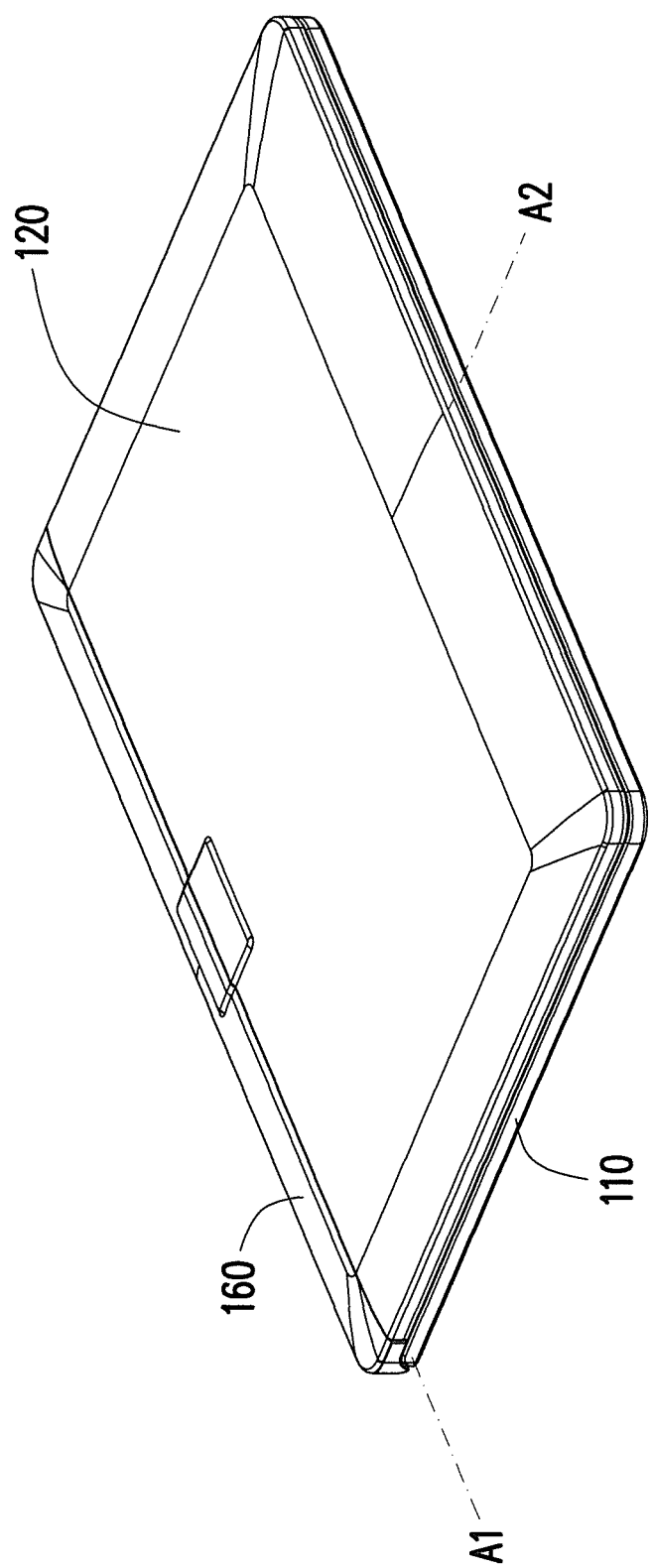
FIG. 3 illustrates the second body depicted in FIG. 1 is closed relative to the first body.

FIG. 1 is a three-dimensional view illustrating an electronic device according to an embodiment of the invention. FIG. 2 illustrates the second body depicted in FIG. 1 rotates relative to the first body. FIG. 3 illustrates the second body depicted in FIG. 1 is closed relative to the first body. With reference to FIG. 1 to FIG. 3, the electronic device 100 provided in the present embodiment is, for instance, a notebook computer and includes a first body 110, a second body 120, at least one first pivot structure 130, and a second pivot structure 140. The first body 110 and the second body 120 are respectively the host and the screen of the notebook computer, for instance. The second pivot structure 140 is pivoted to the first body 110 along a first axis A1 through the first pivot structure 130, and the second body 120 is pivoted to the first pivot structure 130 along a second axis A2 through the second pivot structure 140. Here, the second pivot structure 140 is a pivot structure without torsion.

The second body 120 may be unfolded or folded along the first axis A1 through the first pivot structure, so that the electronic device 100 can be easily carried or stored; the unfolded second body 120 is in the state as shown in FIG. 1, and the folded second body 120 is in the state as shown in FIG. 3. Once the second body 120 is unfolded relative to the first body 110, as shown in FIG. 1, the second body 120 can be rotated relative to the first body 110 through the second pivot structure 140, as shown in FIG. 2, so as to change the direction which the display surface 120a of the second body 120 faces.

The electronic device 100 further includes at least one locking structure 150 (shown in FIG. 2), and the locking structure 150 is arranged between the first pivot structure 130 and the second body 120. When the second body 120 is unfolded relative to the first body 110 to an open position shown in FIG. 1 along the first axis A1, i.e., the second body 120 is unfolded at a 90-degree angle relative to the first body 110, the first pivot structure 130 drives the locking structure 150 to go to an unlocked state, and the second body 120 is adapted to rotate relative to the first body 110 along the second axis A2. When the second body 120 is folded or unfolded relative to the first body 110 to other positions shown in FIG. 3 along the first axis A1, i.e., the second body 120 is unfolded at a non-90-degree angle relative to the first body 110, the first pivot structure 130 drives the locking structure 150 to go to a locked state, and the locking structure 150 stops the second body 120 from rotating relative to the first body 110 along the second axis A2.

As provided above, the locking structure 150 described herein allows the second body 120 to rotate along the second axis A2 relative to the first body 110 only when the second body 120 of the electronic device 100 is unfolded along the first axis A1 to a certain open position, and the locking structure 150 prevents the second body 120 from rotating along the second axis A2 relative to the first body 110 if the second body 120 is folded or unfolded along the first axis A1 to other positions. Thereby, the user will not unexpectedly rotate the second body 120 of the electronic device 100 along the second axis A2; as such, the electronic device 100 can be controlled and operated in a smooth manner, and damages caused by erroneous operations of the second body 120 to the electronic device 100 may be better prevented.

According to the present embodiment, the electronic device 100 includes a base 160 that is located between the first body 110 and the second body 120, and the first pivot structure 130 and the second pivot structure 140 are respectively located on different regions on the base 160 and are individually operated. In addition, the second pivot structure 140 and the locking structure 150 are individually operated as well, i.e., the locking structure 150 in both the unlocked state and the locked state is not in contact with the second pivot structure 140.

FIG. 4A to FIG. 4D are flowcharts of an operation process of the electronic device depicted in FIG. 1. With reference to FIG. 4A to FIG. 4D, particularly, the first pivot structure 130 provided in the present embodiment includes a first component 132 and a second component 134 that are pivoted to each other along the first axis A1 and respectively connected to the first body 110 and the second pivot structure 140, as shown in FIG. 1 and FIG. 2. That is, the second body 120 is pivoted to the second component 134 along the second axis A2 through the second pivot structure 140, as shown in FIG. 1 to FIG. 3. The shapes and the positions of the first and second components illustrated in FIG. 4A to FIG. 4D are merely exemplary; the first component 132 may be a holder or any other appropriate component fixed to the first body 110, and the second component 134 may be a holder, a base, or any other appropriate component fixed to the second pivot structure 140, which should however not be construed as limitations to the invention.

The second body 120 has a positioning trench 120b. The locking structure 150 includes a limiting member 152, a locking member 154, a stopper 156, and an elastic member 158. The limiting member 152 is fixed to the first component 132. Here, the limiting member 152 is a cam and has a first leaning surface 152a and a second leaning surface 152b, and a distance between the first leaning surface 152a and the first axis A1 is less than a distance between the second leaning surface 152b and the first axis A1. The locking member 154 is slidably arranged on the second component 134 and aligned to the positioning trench 120b. The stopper 156 is slidably arranged on the second component 134 along a direction perpendicular to the first axis A1 and located between the limiting member 152 and the locking member 154. The elastic member 158 is connected between the locking member 154 and the second component 134. The stopper 156 described in the present embodiment is a magnetic element (e.g., a permanent magnet), and the limiting member 152 is a magnetically sensitive element (e.g., an iron member), such that a magnetic attraction force is adapted to be generated between the stopper 156 and the limiting member 152, and the stopper 156 continuously leans against the limiting member 152 through the magnetic attraction force.

Figure 4A:
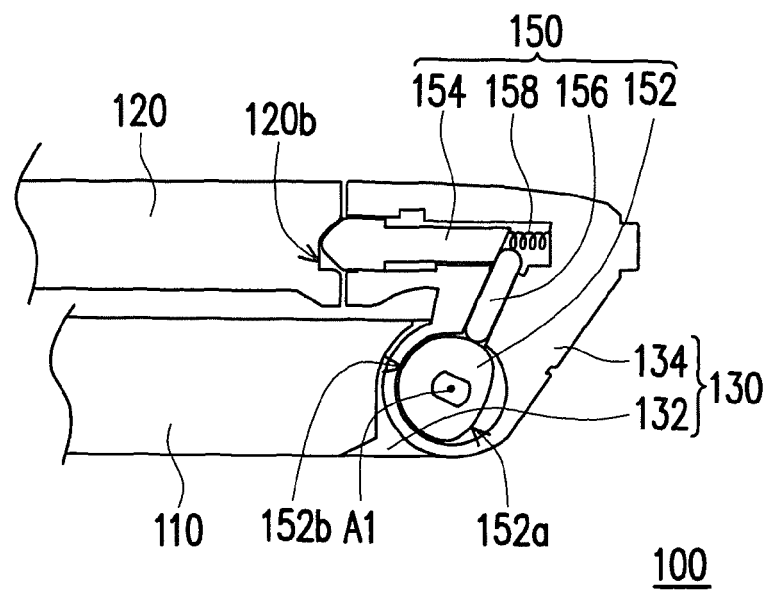
FIG. 4A to FIG. 4D are flowcharts of an operation process of the electronic device depicted in FIG. 1.
Figure 4B:
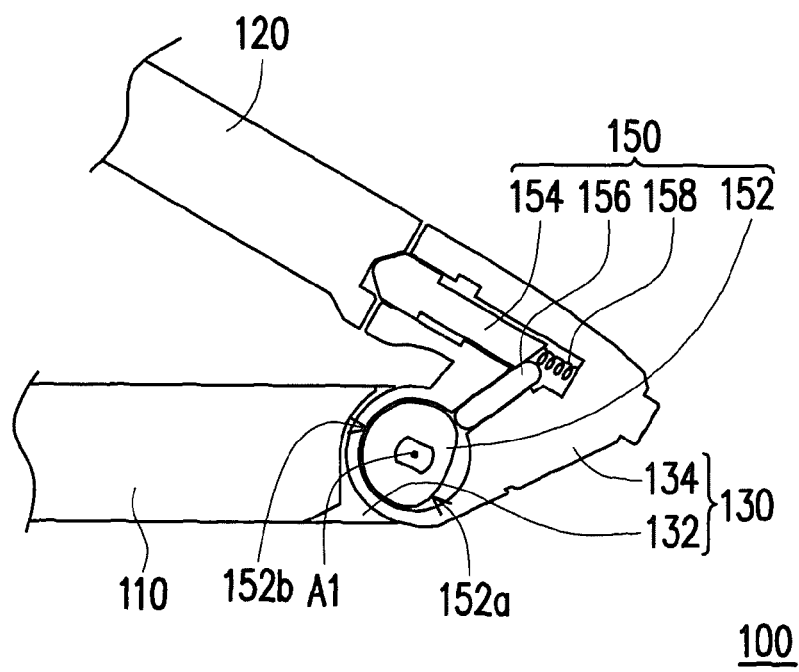
Figure 4C:
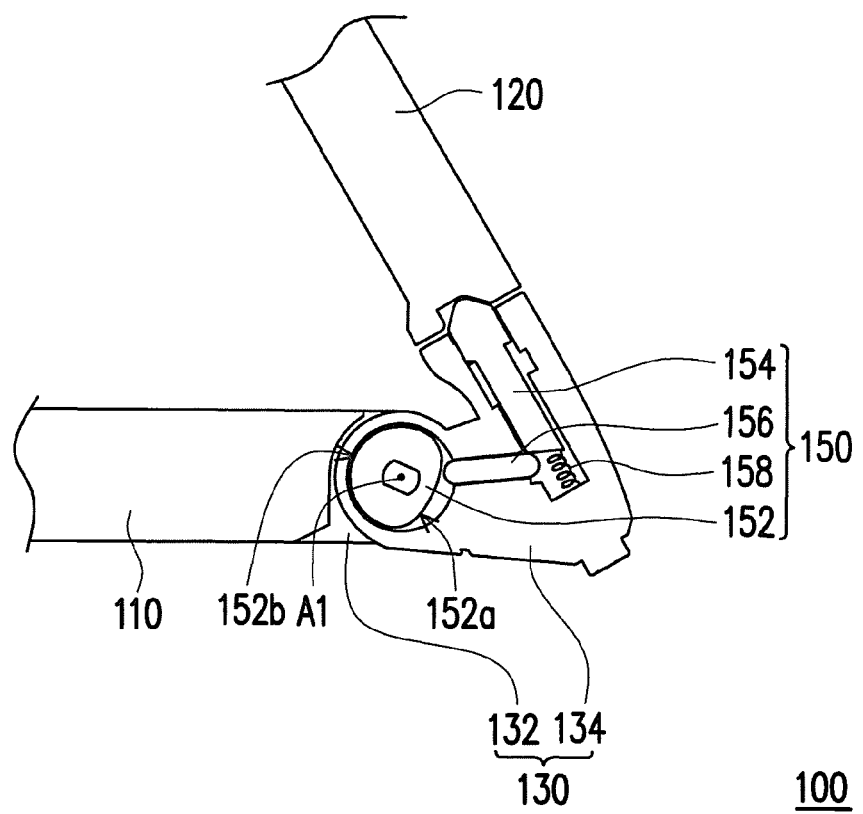
Figure 4D:
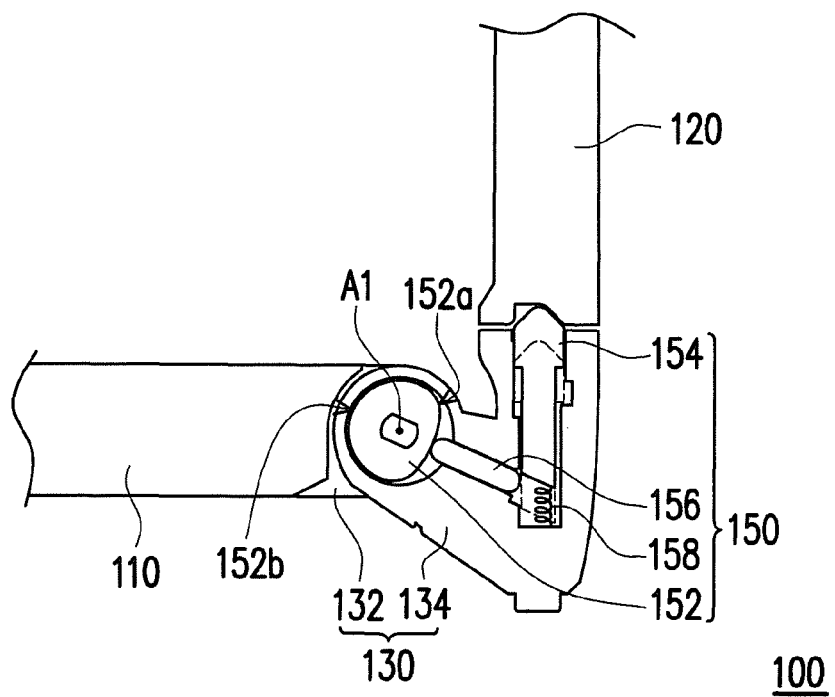

When the second body 120 is unfolded relative to the first body 110 to an open position (shown in FIG. 1 and FIG. 4D) along the first axis A1, the limiting member 152 allows the first leaning surface 152a to be aligned to the stopper 156 (as shown in FIG. 4D) through a relative pivoting action of the first and second components 132 and 134. Here, the stopper 156 leans against the first leaning surface 142a through the magnetic attraction force between the stopper 156 and the limiting member 152 and is released by the limiting member 152, and the stopper 156 is then moved away and releases the locking member 154. Under the circumstances, a user is able to rotate the second body 120 along the second axis A2 (shown in FIG. 1), such that the locking member 154 is pushed by the second body 120 and resists the elastic force of the elastic member 158, and that the locking member 154 (shown by dash lines in FIG. 4D) is moved away from the positioning trench 120b of the second body 120.

When the second body 120 is folded or unfolded relative to the first body 110 to other positions shown along the first axis A1, i.e., when the second body 120 shown in FIG. 4A is folded relative to the first body 110, the second body 120 shown in FIG. 4B is unfolded at a 30-degree angle relative to the first body 110, or the second body 120 shown in FIG. 4C is unfolded at a 60-degree angle relative to the first body 110, the locking member 154 of the locking structure 150 extends into the positioning trench 120b through the elastic force of the elastic member 158 and interferes with the second body 120, and the limiting member 152 allows the second leaning surface 152b to be aligned to the stopper 156 through a relative pivoting action of the first and second components 132 and 134, as shown in FIG. 4A, FIG. 4B, or FIG. 4C. At this time, the stopper 152 is limited by the second leaning surface 152b and stops the locking member 154. Under the circumstances, the stopper 156 prevents the locking member 154 from moving away from the positioning trench 120b of the second body 120 and further prevents the second body 120 from rotating along the second axis A2 relative to the first body 110 (shown in FIG. 1).

With reference to FIG. 1 and FIG. 2, the electronic device 100 provided in the present embodiment includes at least one first magnetic member 170 and at least one second magnetic member 180. The first magnetic member 170 is, for instance, a permanent magnet and located between the second pivot structure 140 and the first pivot structure 130 (in the drawings, the first magnetic member 170 is arranged in the base 160); the second magnetic member 180 is a permanent magnet and arranged on the second body 120. When the electronic device 100 is in the state shown in FIG. 1, the first magnetic member 170 is aligned to the second magnetic member 180, such that the relative positions of the first and second bodies 110 and 120 are fixed through the magnetic attraction force between the first and second magnetic members 170 and 180, and that the user can easily position the second body 120 at the location shown in FIG. 1.

Figure 5:
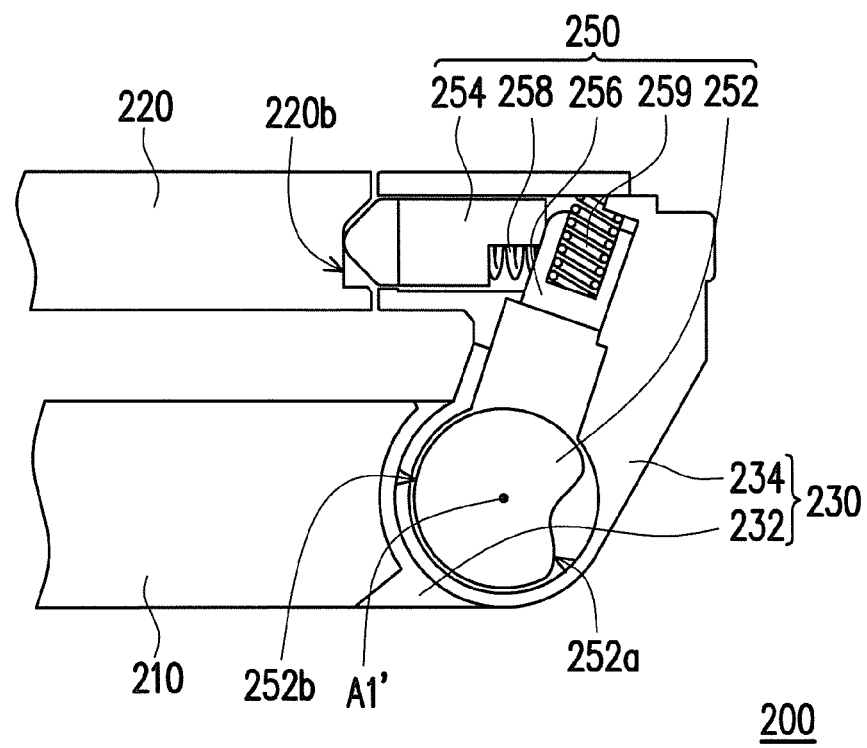
FIG. 5 is a schematic view illustrating a portion of an electronic apparatus according to another embodiment of the invention.

FIG. 5 is a schematic view illustrating a portion of an electronic apparatus according to another embodiment of the invention. The arrangement of the first body 210, the second body 220, the first axis A1', the positioning trench 220b, the first pivot structure 230, the first component 232, the second component 234, the second pivot structure (not shown), the limiting member 252, the first leaning surface 252a, the second leaning surface 252b, the locking member 254, and the elastic member 258 in the electronic device 200 shown in FIG. 5 is similar to the arrangement of the first body 110, the second body 120, the first axis A1, the positioning trench 120b, the first pivot structure 130, the first component 132, the second component 134, the second pivot structure 140, the limiting member 152, the first leaning surface 152a, the second leaning surface 152b, the locking member 154, and the elastic member 158 shown in FIG. 4A, and therefore no further description is provided hereinafter. In addition, in the process of unfolding the second body 220 shown in FIG. 5 at a 90-degree angle relative to the first body 210, the operational behaviors of the limiting member 252, the locking member 254, and the stopper 256 of the locking structure 250 are similar to those of the limiting member 152, the locking member 154, and the stopper 156 shown in FIG. 4A to FIG. 4D, and therefore no further description is provided hereinafter.

The difference between the electronic devices 200 and 100 lies in that the stopper 256 shown in FIG. 5 is not the stopper 256 shown in FIG. 4A, i.e., the stopper 256 is not a magnetic element; hence, the stopper 256 does not continuously lean against the limiting member 152 through the magnetic attraction force between the stopper 256 and the limiting member 252. According to the present embodiment, the locking structure 250 further includes an elastic member 259 that is connected between the stopper 256 and the second component 234, and the stopper 256 continuously leans against the limiting member 252 through an elastic force of the elastic member 259.

Figure 6:
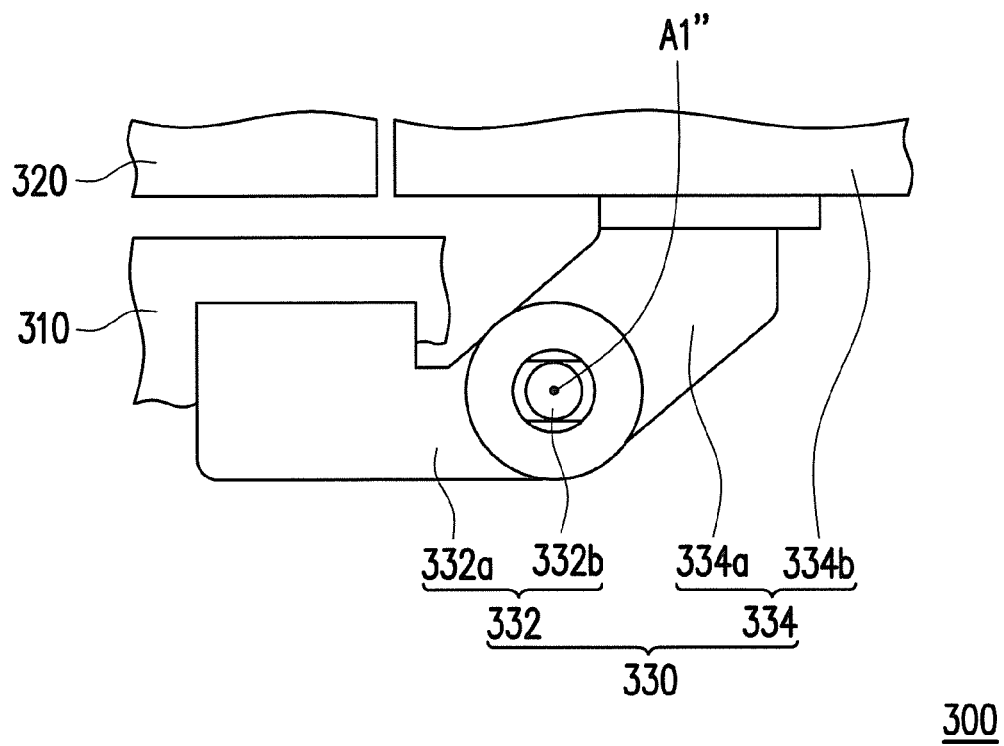
FIG. 6 is a schematic view illustrating a portion of an electronic apparatus according to another embodiment of the invention.
Figure 7:
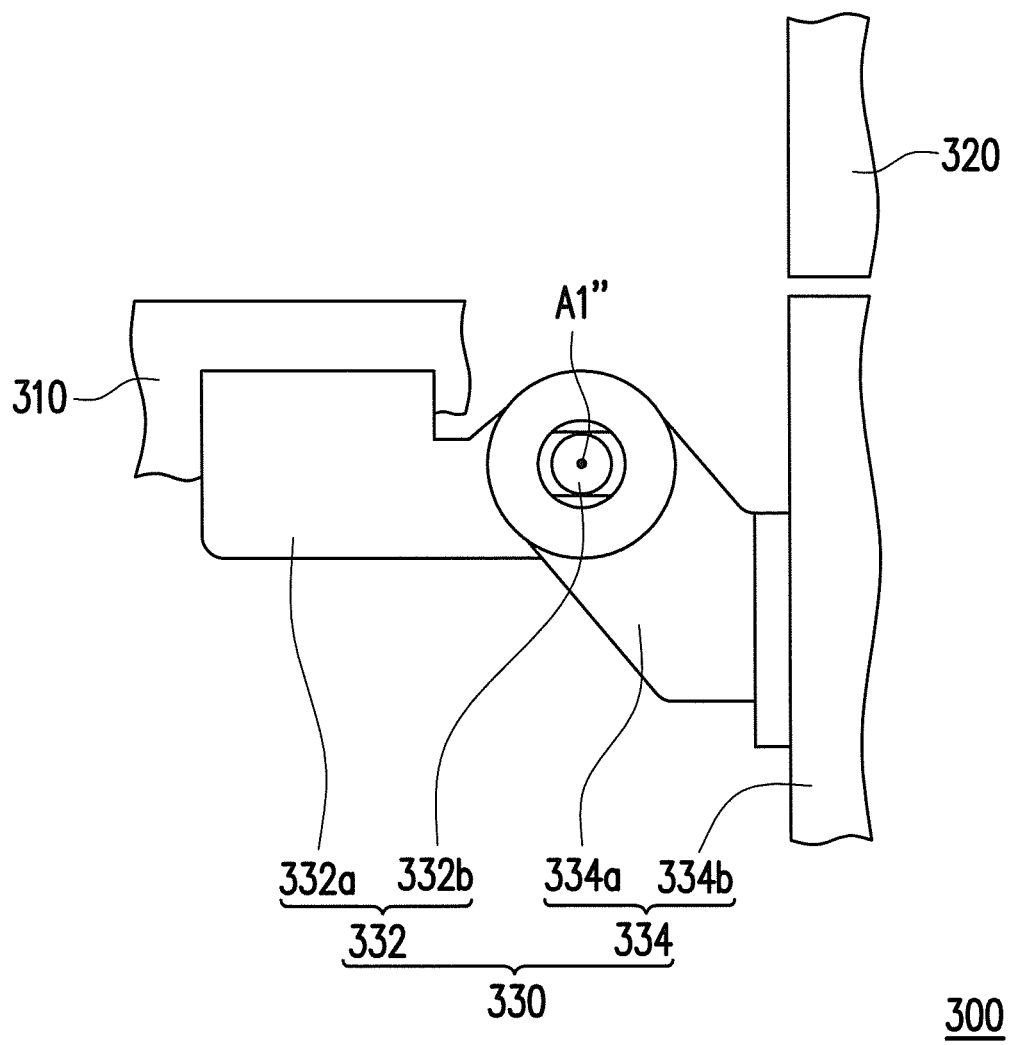
FIG. 7 illustrates the second body depicted in FIG. 6 is unfolded relative to the first body.

FIG. 6 is a schematic view illustrating a portion of an electronic apparatus according to another embodiment of the invention. FIG. 7 illustrates the second body depicted in FIG. 6 is unfolded relative to the first body. With reference to FIG. 6 and FIG. 7, the arrangement and the operational manner of the first body 310, the second body 320, the first pivot structure 330, the first axis A1'', the first component 332, the second component 334, and the second pivot structure (not shown) in the electronic device 300 provided in the present embodiment are similar to those of the first body 110, the second body 120, the first pivot structure 130, the first axis A1, and the second pivot structure 140 shown in FIG. 1 to FIG. 3, and therefore no further description is provided hereinafter. The difference between the electronic devices 300 and 100 is described below.

As shown in FIG. 6 and FIG. 7, the first component 332 of the first pivot structure 330 includes a holder 332a and a core 332b connected to each other. Here, the holder 332a is connected to the first body 310 and is pivoted to the second component 334 along the first axis A1'' through the core 332. The second component 334 of the first pivot structure 330 includes a holder 334a and a base 334b connected to each other, and the base 334b is pivoted to the second body 320 through the second pivot structure. The arrangement and the operational manner of the locking structure of the electronic device 300 are different from those of the locking structure of the electronic device 100, and the locking structure of the electronic device 300 is elaborated hereinafter with reference to the drawings.

Figure 8:
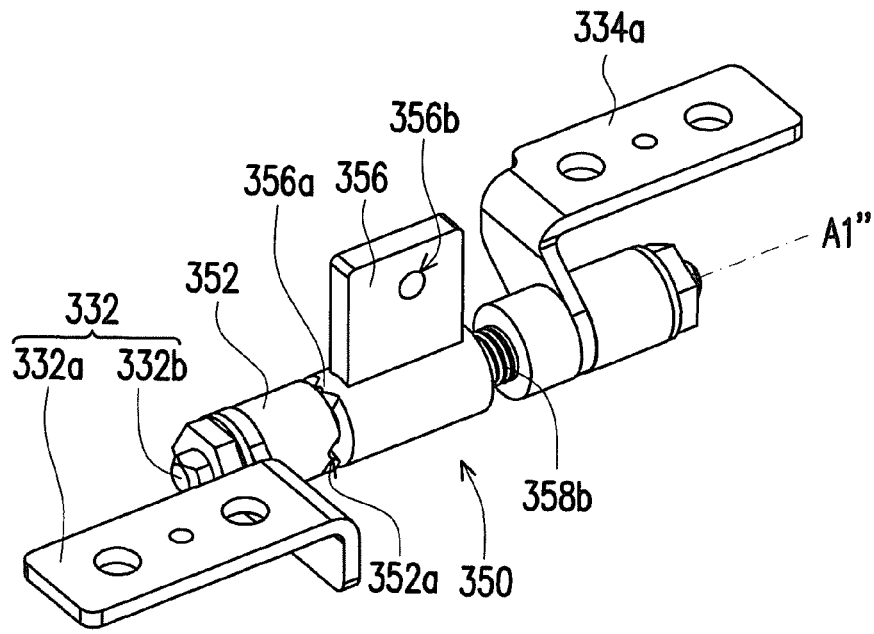
FIG. 8 and FIG. 9 are three-dimensional views illustrating some components in the electronic device depicted in FIG. 6.
Figure 9:
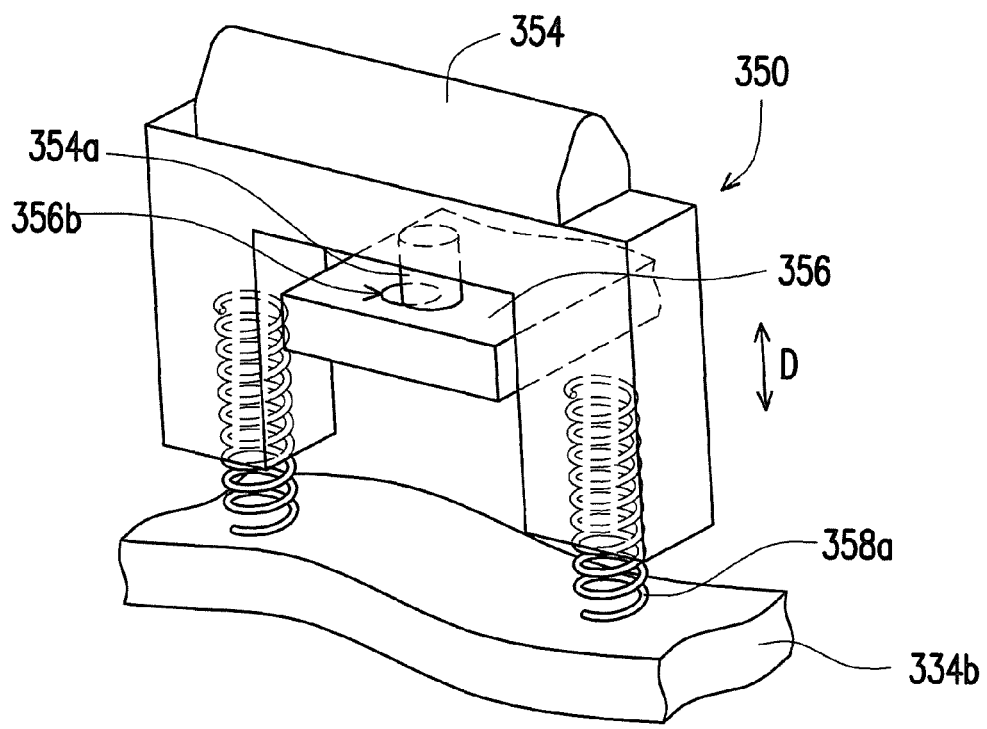
Figure 10:
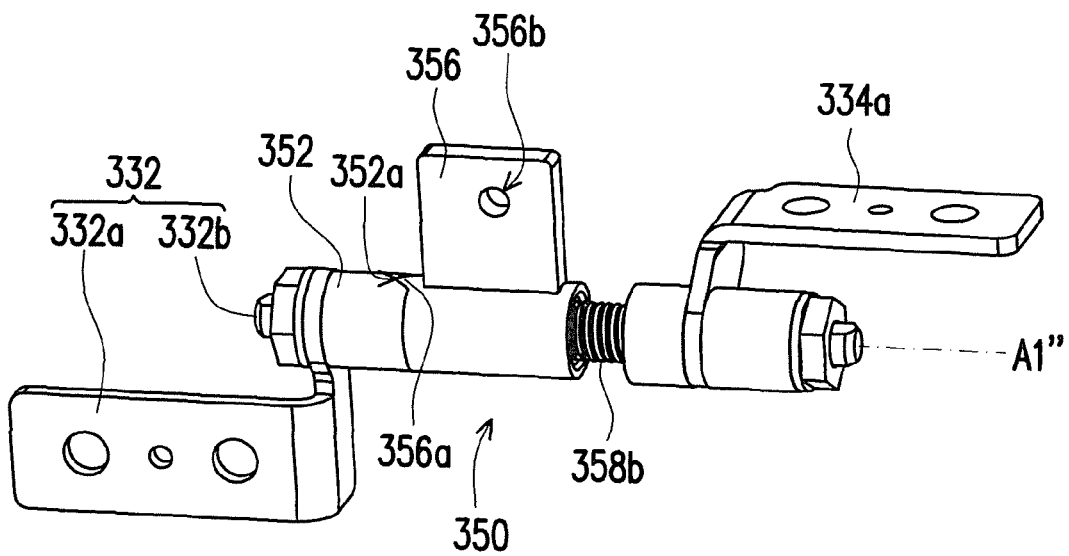
FIG. 10 and FIG. 11 are three-dimensional views illustrating some components in the electronic device depicted in FIG. 7.
Figure 11:
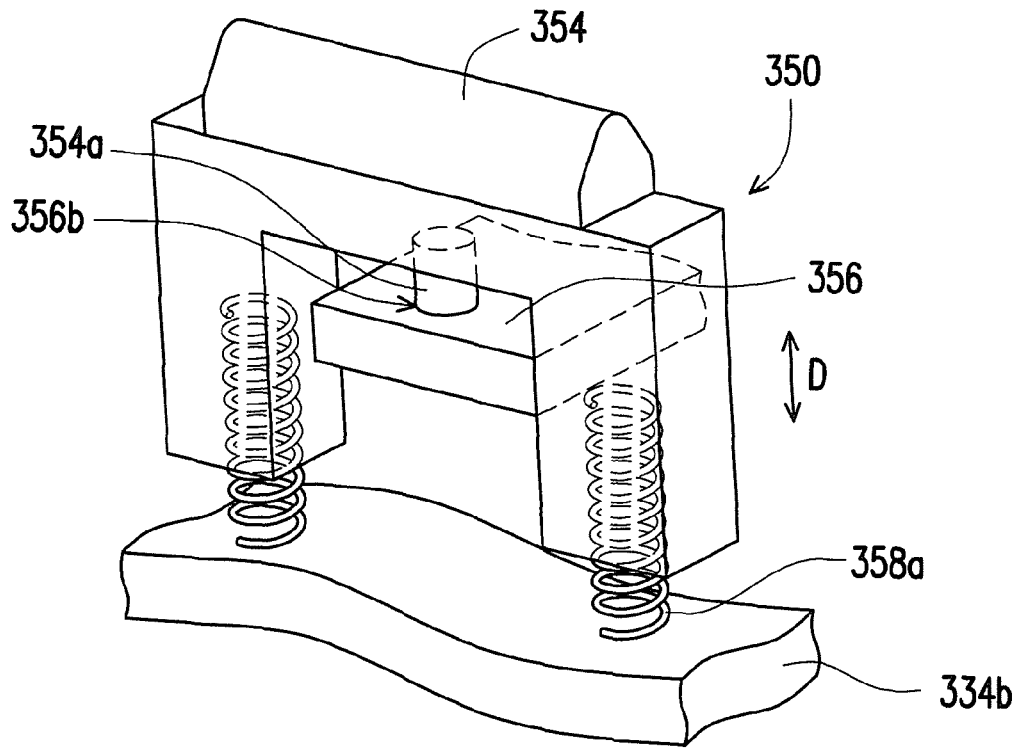
Figure 12:
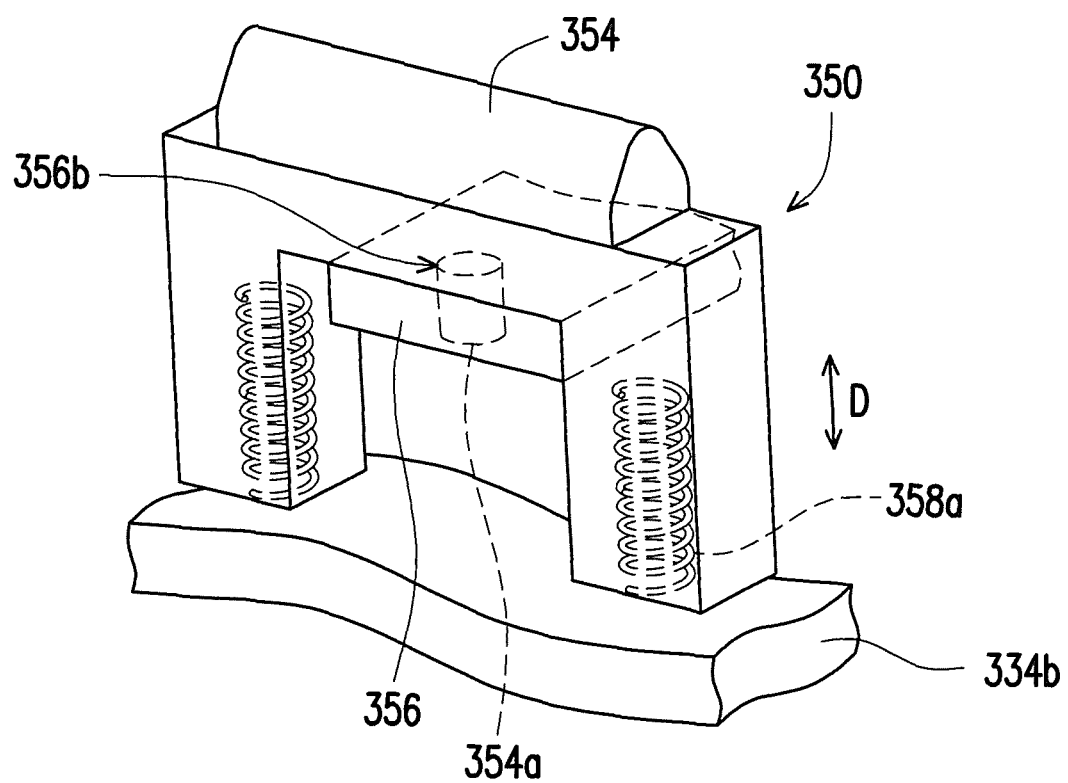
FIG. 12 illustrates that the post depicted in FIG. 11 enters a space-allowing hole.

FIG. 8 and FIG. 9 are three-dimensional views illustrating some components in the electronic device depicted in FIG. 6. FIG. 10 and FIG. 11 are three-dimensional views illustrating some components in the electronic device depicted in FIG. 7. FIG. 12 illustrates that the post depicted in FIG. 11 enters a space-allowing hole. With reference to FIG. 8 to FIG. 11, the locking structure 350 of the electronic device 300 includes a limiting member 352, a locking member 354, a stopper 356, at least one elastic member 358a, and another elastic member 358b. The limiting member 352 is fixed to the first component 332 and has a recess 352a. The locking member 350 is slidably arranged on the second component 334 (shown in FIG. 6) along the direction D (shown in FIG. 9) and has a post 354a. Here, the locking member 354 is adapted to interfere with the second body 320 shown in FIG. 6 and FIG. 7 through the elastic force of the elastic member 358a. For illustrative purposes, FIG. 9 merely shows parts of the base 334b; as a matter of fact, the locking member 354 is at least partially slidably arranged in the base 334b and interferes with the positioning trench of the second body 320, for instance. The stopper 356 is slidably arranged on the core 332b of the first component 332 along a direction parallel to the first axis A1'' and is located between the limiting member 352 and the locking member 354. Besides, the stopper 356 has a protrusion 356a and a space-allowing hole 356b. The elastic member 358a is connected between the locking member 354 and the base 334b of the second component 334. The elastic member 358b is connected between the stopper 356 and the first component 332, and the stopper 356 continuously leans against the limiting member 352 through an elastic force of the elastic member 358b.

When the second body 320 shown in FIG. 6 is unfolded relative to the first body 310 along the first axis A1'' to the open position shown in FIG. 7, the limiting member 352 shown in FIG. 8 allows the protrusion 356a to be aligned to the recess 352a through the relative pivoting action of the first and second components 332 and 334, as shown in FIG. 10, so as to release the stopper 356. At this time, through the elastic force of the elastic member 358b, the protrusion 356a enters the recess 352a as shown in FIG. 10, and the space-allowing hole 356b of the stopper 356 is aligned to the post 354a of the locking member 354 as shown in FIG. 11, so as to release the locking member 354. Under the circumstances, a user is able to rotate the second body 320 (shown in FIG. 7), such that the locking member 354 is pushed by the second body 320 to resist the elastic force of the elastic member 358a and move downwardly, and the post 354a enters the space-allowing hole 356b as shown in FIG. 12, so as to drive the locking member 354 to move away from the second body 320.

When the second body 320 is folded or unfolded relative to the first body 310 to other positions shown along the first axis A1'', i.e., when the second body 320 shown in FIG. 6 is folded relative to the first body 310, or when an unfolded angle of the second body 320 relative to the first body 110 is different from that shown in FIG. 7, the limiting member 352 allows the protrusion 356a to be aligned to the recess 352a through the relative pivoting action of the first and second components 332 and 334, as shown in FIG. 8. At this time, the stopper 352 limits the stopper 356, and the space-allowing hole 356a of the stopper 356 is misaligned to the post 354a of the locking member 354, as shown in FIG. 9, so as to prevent the post 354a from entering the space-allowing hole 356a (i.e., prevent the locking member 354 from moving away from the second body 320) and further prevent the second body 320 from rotating relative to the first body 310.

To sum up, the locking structure described herein allows the second body to rotate relative to the first body only when the second body of the electronic device is unfolded to a certain open position, and the locking structure prevents the second body from rotating relative to the first body if the second body is folded or unfolded to other positions. Thereby, the user will not unexpectedly rotate the second body of the electronic device; as such, the electronic device can be controlled and operated in a smooth manner, and damages caused by erroneous operations of the second body to the electronic device may be better prevented.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. An electronic device comprising:
   a first body and a second body;
   a first pivot structure and a second pivot structure, the second pivot structure being pivoted to the first body along a first axis through the first pivot structure, the second body being pivoted to the first pivot structure along a second axis through the second pivot structure; and
   a locking structure located between the first pivot structure and the second body, wherein when the second body is unfolded relative to the first body to an open position along the first axis, the first pivot structure drives the locking structure to go to an unlocked state, and the second body is adapted to rotate relative to the first body along the second axis, and when the second body is folded or unfolded relative to the first body to other positions along the first axis, the first pivot structure drives the locking structure to go to a locked state, and the locking structure stops the second body from rotating relative to the first body along the second axis,
   wherein the locking structure in both the unlocked state and the locked state is not in contact with the second pivot structure.

2. The electronic device according to claim 1, wherein the second pivot structure is a pivot structure without torsion.

3. The electronic device according to claim 1, wherein the second body has a positioning trench, and the locking structure is adapted to extend into the positioning trench and stop the second body from rotating relative to the first body along the second axis.

4. The electronic device according to claim 1, further comprising a base located between the first body and the second body, the first pivot structure and the second pivot structure being respectively located on different regions on the base.

5. The electronic device according to claim 1, wherein the first pivot structure comprises a first component and a second component pivoted to each other along the first axis and respectively connected to the first body and the second pivot structure, and the locking structure comprises:
   a limiting member fixed to the first component;
   a locking member movably arranged on the second component; and
   a stopper movably arranged on the first component or the second component and located between the limiting member and the locking member, wherein when the second body is unfolded relative to the first body to the open position along the first axis, the limiting member releases the stopper through a relative pivoting action of the first and second components, such that the stopper is adapted to release the locking member, and that the locking member is adapted to be moved away from the second body, and when the second body is folded or unfolded relative to the first body to other positions along the first axis, the limiting member limits the stopper through the relative pivoting action of the first and second components, and the stopper stops the locking member from being moved away from the second body.

6. The electronic device according to claim 5, wherein the locking structure comprises an elastic member connected to the locking member, and the locking member is adapted to interfere with the second body through an elastic force of the elastic member.

7. The electronic device according to claim 5, wherein the locking structure comprises an elastic member connected to the stopper, and the stopper continuously leans against the limiting member through an elastic force of the elastic member.

8. The electronic device according to claim 5, wherein the stopper is slidably arranged on the second component along a direction perpendicular to or parallel to the first axis.

9. The electronic device according to claim 5, wherein the limiting member is a cam and has a first leaning surface and a second leaning surface, a distance between the first leaning surface and the first axis is less than a distance between the second leaning surface and the first axis, when the second body is located at the open position, the first leaning surface is aligned to the stopper, such that the stopper is adapted to lean against the first leaning surface and be moved away from the locking member, and when the second body is located at other positions, the second leaning surface is aligned to the stopper, such that the stopper is limited by the second leaning surface and stops the locking member.

10. The electronic device according to claim 5, wherein a magnetic attraction force is adapted to be generated between the stopper and the limiting member, and the stopper continuously leans against the limiting member through the magnetic attraction force.

11. The electronic device according to claim 10, wherein the stopper is a magnetic element, and the limiting member is a magnetically sensitive element.

12. The electronic device according to claim 5, wherein the limiting member has a recess, the stopper has a protrusion and a space-allowing hole, the locking member has a post, when the second body is located at the open position, and the protrusion is aligned to the recess, the protrusion is adapted to enter the recess to drive the space-allowing hole to be aligned to the post, and the post is adapted to enter the space-allowing hole to drive the locking member to move away from the second body, and when the second body is located at other positions, and the protrusion is misaligned to the recess, the stopper s limited by the limiting member, and the space-allowing hole is misaligned to the post to stop the post from entering the space-allowing hole.

13. The electronic device according to claim 1, further comprising a first magnetic member and a second magnetic member, the first magnetic member being arranged between the second pivot structure and the first pivot structure, the second magnetic member being arranged on the second body, wherein relative positions of the first body and the second body are adapted to be fixed through a magnetic attraction force between the first magnetic member and the second magnetic member.

14. A locking structure adapted to an electronic device, the electronic device comprising a first body, a second body, a first pivot structure, and a second pivot structure, the first pivot structure comprising a first component and a second component pivoted to each other along a first axis and respectively connected to the first body and the second pivot structure, the second body being pivoted to the second component along a second axis through the second pivot structure, the locking structure comprising:

a limiting member fixed to the first component;

a locking member movably arranged on the second component; and a stopper movably arranged on the first component or the second component and located between the limiting member and the locking member, wherein when the second body is unfolded relative to the first body to an open position along the first axis, the limiting member releases the stopper through a relative pivoting action of the first and second components, such that the stopper is adapted to release the locking member, and that the locking member is adapted to be moved away from the second body, and when the second body is folded or unfolded relative to the first body to other positions along the first axis, the limiting member limits the stopper through the relative pivoting action of the first and second components, and the stopper stops the locking member from being moved away from the second body.

15. The locking structure according to claim 14, further comprising an elastic member connected to the locking member, the locking member being adapted to interfere with the second body through an elastic force of the elastic member.

16. The locking structure according to claim 14, further comprising an elastic member connected to the stopper, the stopper continuously leaning against the limiting member through an elastic force of the elastic member.

17. The locking structure according to claim 14, wherein the stopper is slidably arranged on the second component along a direction perpendicular to or parallel to the first axis.

18. The locking structure according to claim 14, wherein the limiting member is a care and has a first leaning surface and a second leaning surface, a distance between the first leaning surface and the first axis is less than a distance between the second leaning surface and the first axis, when the second body is located at the open position, the first leaning surface is aligned to the stopper, such that the stopper is adapted to lean against the first leaning surface and be moved away from the locking member, and when the second body is located at other positions, the second leaning surface is aligned to the stopper, such that the stopper is limited by the second leaning surface and stops the locking member.

19. The locking structure according to claim 14, wherein a magnetic attraction force is adapted to be generated between the stopper and the limiting member, and the stopper continuously leans against the limiting member through the magnetic attraction force.

20. The locking structure according to claim 14, wherein the limiting member has a recess, the stopper has a protrusion and a space-allowing hole, the locking member has a post, when the second body is located at the open position, and the protrusion is aligned to the recess, the protrusion is adapted to enter the recess to drive the space-allowing hole to be aligned to the post, and the post is adapted to enter the space-allowing hole to drive the locking member to move away from the second body, and when the second body is located at other positions, and the protrusion is misaligned to the recess, the stopper is limited by the limiting member, and the space-allowing hole is misaligned to the post to stop the post from entering the space-allowing hole.

* * * * *